(12) United States Patent
Kim et al.

(10) Patent No.: US 12,671,469 B2
(45) Date of Patent: Jun. 30, 2026

(54) METHOD OF TRANSMITTING AND RECEIVING BEAMFORMING SIGNAL AND SIGNAL TRANSCERIVER FOR IMPLEMENTING THE SAME

(71) Applicant: ELECTRONICS AND TELECOMMUNICATIONS RESEARCH INSTITUTE, Daejeon (KR)

(72) Inventors: Keun Young Kim, Daejeon (KR); Jung Ho Myung, Daejeon (KR); Sung Ho Chae, Incheon (KR); Hyeon Woong Kim, Seoul (KR); Hyun Jung Park, Yongin-si (KR); Su Hyun Oh, Goyang-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 585 days.

(21) Appl. No.: 18/131,990

(22) Filed: Apr. 7, 2023

(65) Prior Publication Data

US 2023/0379017 A1    Nov. 23, 2023

(30) Foreign Application Priority Data

Apr. 7, 2022    (KR) ......................... 10-2022-0043397

(51) Int. Cl.
H04B 7/0456    (2017.01)
(52) U.S. Cl.
CPC .................................. H04B 7/0456 (2013.01)
(58) Field of Classification Search
CPC ... H04B 7/0452; H04B 7/0456; H04B 7/0617
See application file for complete search history.

(56) References Cited

U.S. PATENT DOCUMENTS 7,885,349 B2 * 2/2011 Lee ...................... H04B 7/0671
370/335
8,976,892 B2 * 3/2015 Shin ..................... H04B 7/0434
375/296

(Continued)

FOREIGN PATENT DOCUMENTS

KR   10-2011-0106646 A   9/2011
KR   10-2014-0075671 A   6/2014

OTHER PUBLICATIONS

Jihye An et al., "Sum-Rate Maximization of Rate-Splitting Multiple Access with Zero-Forcing Beamforming", The Journal of Korean Institute of Communications and Information Sciences, Sep. 2020, vol. 45 No. 09, pp. 1483-1492.

*Primary Examiner* — Dung B Huynh
(74) *Attorney, Agent, or Firm* — LRK PATENT LAW FIRM

(57) ABSTRACT

A signal transmitting method suitable for a MU-MIMO environment and achieving a high performance with low complexity is provided. The signal transmitting method includes: splitting each message stream into a common message stream and a private message stream; combining a plurality of common message streams for the plurality of receivers to generate a common stream; encoding the common stream and private message streams for the plurality of receivers to generate an encoded common stream and encoded private message streams; precoding the encoded common stream and the encoded private message streams to adjust amplitudes and phases of symbols such that power is distributed between the encoded common stream and the encoded private message streams and generate precoded signals; and converting the precoded signals into a plurality of RF signals, adjusting phases of the plurality of RF signals, and outputting the phase-adjusted RF signals through a plurality of MIMO antennas.

18 Claims, 13 Drawing Sheets

(56) References Cited

U.S. PATENT DOCUMENTS

| | | | | |
|---|---|---|---|---|
| 9,094,029 B2* | 7/2015 | Xu | H04L 1/203 |
| 9,490,938 B1* | 11/2016 | Xu | H04L 25/067 |
| 9,516,602 B2* | 12/2016 | Kim | H04B 7/0639 |
| 10,009,088 B2* | 6/2018 | Rahman | H04L 5/0048 |
| 10,374,670 B2 | 8/2019 | Bethanabhotla et al. | |
| 10,623,068 B2* | 4/2020 | Taira | H04B 7/043 |
| 10,707,974 B1* | 7/2020 | Ho | H04B 17/14 |
| 10,862,591 B1* | 12/2020 | Hassan | H04B 10/695 |
| 11,032,018 B1* | 6/2021 | Koshy | H04L 1/0048 |
| 11,146,314 B2 | 10/2021 | Choi et al. | |
| 11,152,984 B2* | 10/2021 | Li | H04L 25/0248 |
| 11,219,038 B2 | 1/2022 | Kwon et al. | |
| 11,870,516 B2* | 1/2024 | Ibrahim | H04W 52/367 |
| 11,894,965 B2* | 2/2024 | Shattil | H04L 27/2636 |
| 11,902,188 B1* | 2/2024 | Kowdley | H04B 17/336 |
| 11,973,549 B2* | 4/2024 | Ramireddy | H04B 7/0634 |
| 11,984,949 B2* | 5/2024 | Jacobsson | H04L 27/368 |
| 12,245,247 B2* | 3/2025 | Abotabl | H04W 72/23 |
| 2002/0181390 A1* | 12/2002 | Mody | H04L 27/2602 |
| | | | 370/208 |
| 2004/0132496 A1* | 7/2004 | Kim | H04L 1/0003 |
| | | | 455/562.1 |
| 2005/0063378 A1* | 3/2005 | Kadous | H04L 1/0002 |
| | | | 370/389 |
| 2006/0015892 A1* | 1/2006 | Hirt | G01S 5/0018 |
| | | | 725/10 |
| 2007/0054633 A1* | 3/2007 | Piirainen | H04B 7/0697 |
| | | | 455/67.11 |
| 2008/0013642 A1* | 1/2008 | Nam | H04L 1/0625 |
| | | | 375/267 |
| 2008/0112504 A1* | 5/2008 | Jiang | H04L 1/0618 |
| | | | 375/296 |
| 2009/0067525 A1* | 3/2009 | Kim | H04L 5/0051 |
| | | | 375/260 |
| 2009/0262719 A1* | 10/2009 | Shim | H04B 7/0452 |
| | | | 370/342 |
| 2010/0034312 A1* | 2/2010 | Muharemovic | H04B 7/0417 |
| | | | 375/267 |
| 2010/0041409 A1* | 2/2010 | Kim | H04L 1/0002 |
| | | | 455/450 |
| 2010/0061479 A1* | 3/2010 | Mazet | H04L 27/3488 |
| | | | 375/295 |
| 2010/0215110 A1* | 8/2010 | Onggosanusi | H04B 7/0456 |
| | | | 375/295 |
| 2011/0206154 A1* | 8/2011 | Ding | H04L 5/0035 |
| | | | 375/267 |
| 2011/0211547 A1* | 9/2011 | Kim | H04W 72/046 |
| | | | 370/328 |
| 2011/0235750 A1* | 9/2011 | Shin | H04B 7/0434 |
| | | | 375/296 |
| 2012/0002599 A1* | 1/2012 | Annavajjala | H04L 5/0023 |
| | | | 370/328 |
| 2012/0039411 A1* | 2/2012 | Khojastepour | H04L 5/0023 |
| | | | 375/267 |
| 2012/0113897 A1* | 5/2012 | Thiele | H04B 7/0452 |
| | | | 370/328 |
| 2012/0140780 A1* | 6/2012 | Chang | H04L 25/03006 |
| | | | 398/43 |
| 2012/0201282 A1* | 8/2012 | Li | H04B 7/0426 |
| | | | 375/296 |
| 2013/0237210 A1* | 9/2013 | Kang | H04B 7/0617 |
| | | | 455/422.1 |
| 2014/0056207 A1* | 2/2014 | Shin | H04B 7/0615 |
| | | | 370/312 |
| 2014/0056334 A1* | 2/2014 | Khina | H04L 25/0242 |
| | | | 375/211 |
| 2014/0086296 A1* | 3/2014 | Badic | H04L 27/0008 |
| | | | 375/229 |
| 2014/0146756 A1* | 5/2014 | Sahin | H04L 1/1607 |
| | | | 370/328 |
| 2014/0226754 A1* | 8/2014 | Lee | H04L 27/2601 |
| | | | 375/295 |
| 2015/0010104 A1* | 1/2015 | Park | H04L 1/0625 |
| | | | 375/295 |
| 2015/0139293 A1* | 5/2015 | Stanwood | H04L 27/04 |
| | | | 375/259 |
| 2015/0349932 A1* | 12/2015 | Onodera | H04L 1/1812 |
| | | | 370/329 |
| 2016/0013903 A1* | 1/2016 | Kim | H04L 1/00 |
| | | | 370/329 |
| 2016/0329999 A1* | 11/2016 | Li | H04L 5/0053 |
| 2017/0047974 A1* | 2/2017 | Vu | H04B 7/0465 |
| 2017/0222698 A1* | 8/2017 | Lange | H04B 7/022 |
| 2017/0230138 A1* | 8/2017 | Xiong | H04W 72/23 |
| 2017/0257195 A1* | 9/2017 | Maaref | H04L 5/0053 |
| 2017/0279501 A1* | 9/2017 | Kim | H04B 7/0479 |
| 2017/0359827 A1* | 12/2017 | Kim | H04L 1/1822 |
| 2017/0366381 A1* | 12/2017 | Zoellner | H04L 5/001 |
| 2018/0006696 A1* | 1/2018 | Yue | H04B 7/0452 |
| 2018/0013473 A1* | 1/2018 | Tosato | H04L 1/0618 |
| 2018/0076881 A1* | 3/2018 | Zhu | H04B 7/0452 |
| 2018/0139703 A1* | 5/2018 | Zhu | H04W 72/0473 |
| 2018/0145811 A1* | 5/2018 | Park | H04L 69/323 |
| 2018/0152939 A1* | 5/2018 | Lee | H04L 1/1812 |
| 2018/0242344 A1* | 8/2018 | Huang | H04W 72/52 |
| 2018/0302150 A1* | 10/2018 | Chang | G01S 13/933 |
| 2018/0375554 A1* | 12/2018 | Faxér | H04B 7/0478 |
| 2019/0089565 A1* | 3/2019 | Nakada | H04J 11/0023 |
| 2019/0097704 A1* | 3/2019 | Faronius | H04B 7/0617 |
| 2019/0115963 A1* | 4/2019 | Zhu | H04B 7/0617 |
| 2019/0141651 A1* | 5/2019 | Venkatachalam Jayaraman | H04W 56/0005 |
| 2019/0253123 A1* | 8/2019 | Su | H04B 7/0868 |
| 2019/0260434 A1* | 8/2019 | Park | H04B 7/0626 |
| 2019/0372631 A1* | 12/2019 | Taira | H04B 7/0452 |
| 2019/0393936 A1* | 12/2019 | Motozuka | H04B 7/0456 |
| 2020/0021342 A1* | 1/2020 | Ge | H01Q 3/46 |
| 2020/0204224 A1* | 6/2020 | Kang | H04L 5/0094 |
| 2020/0228935 A1* | 7/2020 | Elia | H04W 4/08 |
| 2020/0259536 A1* | 8/2020 | Iura | H04B 7/088 |
| 2020/0403666 A1* | 12/2020 | Kapetanovic | H04B 7/0456 |
| 2021/0134159 A1* | 5/2021 | Cao | H04W 4/40 |
| 2021/0143887 A1 | 5/2021 | Oteri et al. | |
| 2021/0167910 A1* | 6/2021 | Lee | H04L 27/00 |
| 2021/0195563 A1* | 6/2021 | Lee | H04W 12/041 |
| 2021/0227472 A1* | 7/2021 | Liu | H04L 27/2636 |
| 2021/0288704 A1* | 9/2021 | Shim | H04L 5/0057 |
| 2021/0297300 A1* | 9/2021 | Zhang | H04L 27/2626 |
| 2021/0320698 A1* | 10/2021 | Sharafat | H04B 7/0456 |
| 2021/0345253 A1* | 11/2021 | Matsumura | H04B 7/0628 |
| 2021/0345399 A1 | 11/2021 | Levy et al. | |
| 2021/0351819 A1 | 11/2021 | Perlman et al. | |
| 2022/0021426 A1* | 1/2022 | Piirainen | H04B 7/024 |
| 2022/0029672 A1 | 1/2022 | Forenza et al. | |
| 2022/0069879 A1* | 3/2022 | Wernersson | H04B 7/0626 |
| 2022/0094403 A1* | 3/2022 | Forenza | H04B 7/0456 |
| 2022/0321192 A1* | 10/2022 | Katla | H04B 7/0696 |
| 2022/0345232 A1* | 10/2022 | Orhan | H04B 7/0695 |
| 2022/0352933 A1* | 11/2022 | Rakib | H04L 5/0023 |
| 2022/0353114 A1* | 11/2022 | Robinson | H04L 9/0894 |
| 2022/0400475 A1* | 12/2022 | Suh | H04W 72/23 |
| 2023/0179462 A1* | 6/2023 | Shattil | H04L 27/2634 |
| | | | 375/295 |
| 2023/0199494 A1* | 6/2023 | Balasubramanian | H04W 12/106 |
| | | | 455/411 |
| 2023/0316062 A1* | 10/2023 | Balevi | G06N 3/098 |
| | | | 706/25 |
| 2023/0379017 A1* | 11/2023 | Kim | H04B 7/0456 |
| 2023/0388950 A1* | 11/2023 | He | H04J 11/0076 |
| 2023/0397208 A1* | 12/2023 | Khoshnevisan | H04L 1/0003 |
| 2024/0090026 A1* | 3/2024 | Prasad | H04B 7/06952 |
| 2024/0224306 A1* | 7/2024 | Elshafie | H04W 76/14 |
| 2024/0250799 A1* | 7/2024 | Rastegardoost | H04L 5/0096 |
| 2024/0259880 A1* | 8/2024 | Echigo | H04L 1/0003 |
| 2024/0292383 A1* | 8/2024 | Shibaike | H04W 72/044 |
| 2024/0313828 A1* | 9/2024 | Elshafie | H04L 9/0875 |
| 2024/0340049 A1* | 10/2024 | Hu | H04B 7/061 |
| 2024/0380450 A1* | 11/2024 | Ibrahim | H04B 7/0695 |
| 2024/0421959 A1* | 12/2024 | Herath | H04L 5/0058 |

(56)        References Cited

U.S. PATENT DOCUMENTS

| | | | | |
|---|---|---|---|---|
| 2024/0422767 A1* | 12/2024 | Elshafie | .............. | H04W 72/121 |
| 2025/0047347 A1* | 2/2025 | Li | ........................ | H04B 17/328 |
| 2025/0125841 A1* | 4/2025 | Huang | ................. | H04L 5/0023 |
| 2025/0141501 A1* | 5/2025 | Chiskis | ................ | H04B 7/0452 |
| 2025/0159518 A1* | 5/2025 | Muruganathan | ...... | H04L 5/0051 |
| 2025/0202544 A1* | 6/2025 | Jo | ........................ | H04B 7/0626 |
| 2025/0233687 A1* | 7/2025 | Abidrabbu | .......... | H04W 52/281 |

* cited by examiner

FIG. 4

METHOD OF TRANSMITTING AND RECEIVING BEAMFORMING SIGNAL AND SIGNAL TRANSCERIVER FOR IMPLEMENTING THE SAME

CROSS-REFERENCE TO RELATED APPLICATION

The present application claims a convention priority under 35 U.S.C. § 119(a) based on Korean Patent Application No. 10-2022-0043397, filed on Apr. 7, 2022, the entire content of which is incorporated herein in its entirety by reference.

BACKGROUND

1. Technical Field

The present disclosure relates to a method for transmitting and receiving a signal in a communication apparatus and, more particularly, to a method for transmitting and receiving a signal in a communication apparatus employing a multiple-input multiple-output (MIMO) antenna. In addition, the present disclosure relates to a communication apparatus for implementing the method for transmitting and receiving a signal.

2. Description of Related Art

Broadband communication services such as Augmented Reality (AR), Virtual Reality (VR), Internet of Things (IoT), and real-time streaming of high-definition videos are expected to require high data rates of around 100 gigabits per second (GPS) or higher in mobile communication networks in the near future. In order to achieve such data rates and support the services, a fifth-generation (5G) communication systems has been commercialized and new transmission technologies for 6G communication systems are under active research and developments. To meet the requirements of the 5G and 6G communication systems, it is essential to use a wider communication bandwidth than the bandwidth used for the frequency band of existing 4G LTE communication system. Accordingly, researches are paving a way for an effective use of a terahertz (THz) frequency band, that is, 100 GHz to 10 THz, in addition to a 28 gigahertz (GHz) band which is a millimeter-wave band.

The 6G communication system, particularly, based on the terahertz band is expected to achieve a transmission rate 10 times higher than that of the existing 5G system due to an increase in the bandwidth. However, the millimeter-wave band has a disadvantage of severe path loss compared to the frequency band in 4G LTE communication, and the terahertz band or sub-THz band reveals more severe path loss than the millimeter-wave band. Accordingly, new communication technologies needs to be developed to increase the spectral efficiency and secure cell coverages in these frequency bands.

A massive multiple-input multiple-output (massive-MIMO) antenna system that increases a multiplexing gain and an antenna gain by using a large number of antennas is getting attraction as a promising technology for overcoming the drawbacks of the millimeter-wave band and the terahertz band communication systems. The massive-MIMO has already been employed in the 5G communication system to overcome the propagation attenuation in the millimeter-wave band and increase the system capacity. An ultra Massive MIMO (UM-MIMO) scheme is expected to be applied in the 6G communication system in consideration of a very short wavelength characteristics of a terahertz frequency band signal.

In a UM-MIMO system using dozens to thousands of antenna elements, however, if a number of the RF chains is set to be equal to a number of the antennas as in a conventional MIMO system, the number of RF chains may become too large, which may drastically increase a power consumption and implementation complexity. In order to control the large antenna system, a hybrid beamforming system combining a digital beamforming and an analog beamforming is under development. In the hybrid beamforming system, the digital beamforming may include fewer RF chains than the number of the antenna elements and adjust an amplitude and phase of a signal in the baseband, and the analog beamforming adjusts the signal by phase shifters between the RF chains and the antenna elements. Thus, the hybrid beamforming enables to significantly reduce the power consumption and hardware costs and implement a signal transmission and reception algorithm with low complexity. In addition, the hybrid beamforming system may be designed in a fully-connected architecture where each RF chain is connected with all antenna elements or a sub-connected architecture where each RF chain is connected to only a subset of the available antenna elements depending on the complexity and performance of the system.

Regardless of the connection architecture between the RF chains and the antenna elements, however, as the number of the RF chains and the antenna elements increase, the system becomes more complex and the separation of signals and restoration of a desired signal become more difficult. Therefore, there is a need for a scheme to reduce the difficulty in the reconstruction of the signal and decrease a possibility of an error in a signal receiver of a beamforming signal transmitting and receiving system.

SUMMARY

Provided is a signal transmitting and receiving method suitable for an implementation in a multiple-user multiple-Input multiple-output (MU-MIMO) communication environment and capable of achieving a high performance with a low complexity.

Provided is a signal transmitting and receiving apparatus suitable for implementing the signal transmitting and receiving method.

According to an aspect of an exemplary embodiment, a signal transmitting method in a signal transmitter includes: splitting each of plural message streams to be transmitted to a plurality of receivers into a common message stream and at least one private message stream in a unit of a message stream; combining a plurality of common message streams for the plurality of receivers to generate a common stream; encoding the common stream and private message streams for the plurality of receivers to generate an encoded common stream and encoded private message streams; linearly precoding the encoded common stream and the encoded private message streams to adjust amplitudes and phases of symbols such that power is distributed in a predetermined manner between the encoded common stream and the encoded private message streams and generate precoded signals; and converting the precoded signals into a plurality of RF signals, adjusting phases of the plurality of RF signals, and outputting the plurality of phase-adjusted RF signals through a plurality of multi-input multiple-output (MIMO) antennas.

A sum of a number of the common message streams and a number of the private message streams for each of the plurality of receivers may be determined to be smaller than or equal to a number of RF chains of a corresponding receiver. A sum of a number of common message streams for all the plurality of receivers and a number of private message streams for all the plurality of receivers may be determined to be smaller than or equal to a number of RF chains of the signal transmitter.

The operation of linearly precoding the encoded common stream and the encoded private message streams may include: generating a beamforming matrix for a private stream by generating a digital beamforming matrix for the private stream by a linear combination of a singular value decomposition (SVD) beamforming matrix and a zero forcing (ZF) beamforming matrix and normalizing a size of each column of the digital beamforming matrix to 1; and determining a right unitary matrix obtained by a singular value decomposition of an effective channel matrix of each user as a digital beamforming matrix for the common stream.

The operation of converting the precoded signals and outputting the plurality of phase-adjusted RF signals may include: setting an entire analog beamforming matrix by performing a singular-value decomposition (SVD) of an entire channel matrix to obtain a right unitary matrix and taking only phase values from elements of the right unitary matrix.

The operation of converting the precoded signals and outputting the plurality of phase-adjusted RF signals may include: setting an analog beamforming matrix by multiplying a beamforming matrix for a fully-connected architecture by a block diagonal identity matrix determined according to a sub-connected architecture.

The operation of converting the precoded signals and outputting the plurality of phase-adjusted RF signals may include: setting an analog beamforming matrix by performing a singular-value decomposition (SVD) of a channel matrix for a channel of all users connected to each of sub-connected arrays to obtain a right unitary matrix and taking only phase values from elements of the right unitary matrix.

The operation of converting the precoded signals and outputting the plurality of phase-adjusted RF signals may include: setting an analog beamforming matrix for a channel connected to each sub-connected array by selecting angles of signal paths having strongest intensity as many as a number of data streams and aligning beam formed by the analog beamforming matrix to at least one direction corresponding to the angles.

The signal transmitting method may further include: before splitting each of the plural message streams to be transmitted, determining the receivers and adjusting a proportion of the common data stream and the private data streams according to a signal-to-noise ratio of a transmission channel.

According to another aspect of an exemplary embodiment, provided is a signal receiving method by a signal receiver to receive a signal transmitted by the above signal transmitting method and reconstruct the message stream for the signal receiver. The signal receiving method may include: acquiring a receive signal through a multiple-input multiple-output (MIMO) antenna; decoding the receive signal to reconstruct the common stream; separating the common message stream for the signal receiver from the common stream while excluding common message stream irrelevant to the signal receiver; acquiring a private stream signal component by subtracting a contribution of the common message stream from the received signal; decoding the private stream signal component to recover the private message stream for the receiver; and combining the common message stream for the receiver and the private message stream for the receiver to reconstruct the message stream for the receiver.

The operation of decoding the receive signal to reconstruct the common stream may include: decoding the receive signal while treating signal components caused by the private message stream and irrelevant to the signal receiver as an interference or noise.

The operation of decoding the private stream signal component to recover the private message stream for the receiver may include: decoding the private stream signal component while treating signal components for the other signal receiver in the private stream signal component as an interference or noise.

The operation of acquiring the private stream signal component by subtracting the contribution of the common message stream from the received signal may include: re-encoding a reconstructed common message stream, precoding a re-encoded common message stream, and equalizing a precoded message under a condition simulating an actual channel condition to generate the contribution of the common message stream from the receive signal.

According to yet another aspect of an exemplary embodiment, a signal transmitting apparatus includes: a memory having program instructions stored therein; and a processor coupled to the memory and configured to execute the program instructions stored in the memory. The program instructions, when executed by the processor, are configured to cause the processor to: split each of plural message streams to be transmitted to a plurality of receivers into a common message stream and at least one private message stream in a unit of a message stream; combine a plurality of common message streams for the plurality of receivers to generate a common stream; encode the common stream and private message streams for the plurality of receivers to generate an encoded common stream and encoded private message streams; linearly precode the encoded common stream and the encoded private message streams to adjust amplitudes and phases of symbols such that power is distributed in a predetermined manner between the encoded common stream and the encoded private message streams and generate precoded signals; and convert the precoded signals into a plurality of RF signals, adjust phases of the plurality of RF signals, and output the plurality of phase-adjusted RF signals through a plurality of multi-input multiple-output (MIMO) antennas.

A sum of a number of the common message streams and a number of the private message streams for each of the plurality of receivers may be determined to be smaller than or equal to a number of RF chains of a corresponding receiver. A sum of a number of common message streams for all the plurality of receivers and a number of private message streams for all the plurality of receivers may be determined to be smaller than or equal to a number of RF chains of the signal transmitter.

The program instructions causing the processor to linearly precode the encoded common stream and the encoded private message streams may be configured to cause the processor to: generate a beamforming matrix for a private stream by generating a digital beamforming matrix for the private stream by a linear combination of a singular value decomposition (SVD) beamforming matrix and a zero forcing (ZF) beamforming matrix and normalizing a size of each column of the digital beamforming matrix to 1; and determine a right unitary matrix obtained by a singular value decomposition of an effective channel matrix of each user as a digital beamforming matrix for the common stream.

The program instructions causing the processor to convert the precoded signals and output the plurality of phase-adjusted RF signals may be configured to cause the processor to set an entire analog beamforming matrix by performing a singular-value decomposition (SVD) of an entire channel matrix to obtain a right unitary matrix and taking only phase values from elements of the right unitary matrix.

The program instructions causing the processor to convert the precoded signals and output the plurality of phase-adjusted RF signals may be configured to cause the processor to the precoded signals and output the plurality of phase-adjusted RF signals are configured to cause the processor to set an analog beamforming matrix by multiplying a beamforming matrix for a fully-connected architecture by a block diagonal identity matrix determined according to a sub-connected architecture.

The program instructions causing the processor to convert the precoded signals and output the plurality of phase-adjusted RF signals may be configured to cause the processor to set an analog beamforming matrix by performing a singular-value decomposition (SVD) of a channel matrix for a channel of all users connected to each of sub-connected arrays to obtain a right unitary matrix and taking only phase values from elements of the right unitary matrix.

The program instructions causing the processor to convert the precoded signals and output the plurality of phase-adjusted RF signals may be configured to cause the processor to set an analog beamforming matrix for a channel connected to each sub-connected array by selecting angles of signal paths having strongest intensity as many as a number of data streams and aligning beam formed by the analog beamforming matrix to at least one direction corresponding to the angles.

The program instructions may be configured to further cause the processor to, before splitting each of the plural message streams to be transmitted, determine the receivers and adjusting a proportion of the common data stream and the private data streams according to a signal-to-noise ratio of a transmission channel.

According to exemplary embodiments of the present disclosure, a message to be transmitted to each receiver is split into a common message stream and a private message stream at a signal transmitter side, and the common message streams for multiple receivers are combined and transmitted to the multiple receivers. The signal receiver may separate a common message stream by decoding the receive signal while excluding the signal part for the private message stream irrelevant to the receiver from the received signal and restore its own private message stream. A signal desired by the receiver may be obtained by combining the common message stream and the private message stream associated with the user or user equipment. As a result, the interference or noise may be removed using a successive interference cancellation (SIC) scheme, and the signal transmission and reception performance may be enhanced while maintaining a low level of complexity.

According to an exemplary embodiment, the message splitting may be implemented simply by adjusting the number of the common message streams and the private message streams of each user equipment. In particular, since the power may be uniformly distributed to each message stream and a covariance matrix optimization may be obviated, the implementation complexity may be greatly reduced compared to existing techniques.

According to an exemplary embodiment, the range of the number of common message streams and private message streams of each of the user equipment may be limited by a maximum multiplexing gain constraint of the system. Accordingly, the search space to be considered during an optimization may be reduced, and the advantage of implementing the message splitting with low complexity may become more prominent.

BRIEF DESCRIPTION OF THE DRAWINGS

FIG. 4 is a block diagram of a transmitter channel encoder and a receiver channel decoder in a hybrid beamforming system according to an exemplary embodiment of the present disclosure;

DETAILED DESCRIPTION

Figure 1:
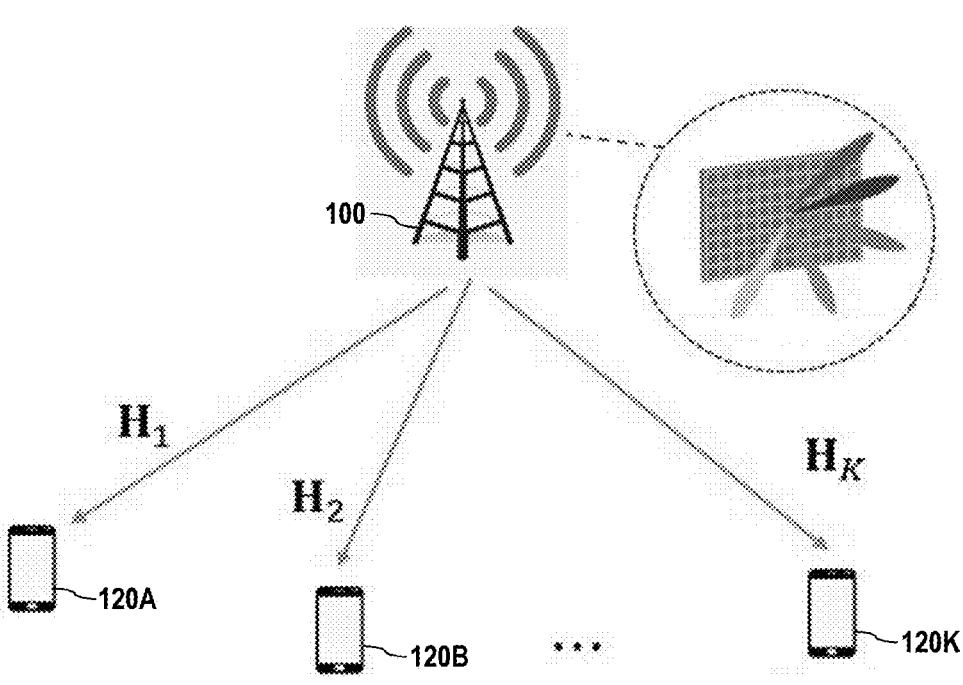
FIG. 1 is a schematic diagram of a wireless communication system according to an exemplary embodiment of the present disclosure.
Figure 2:
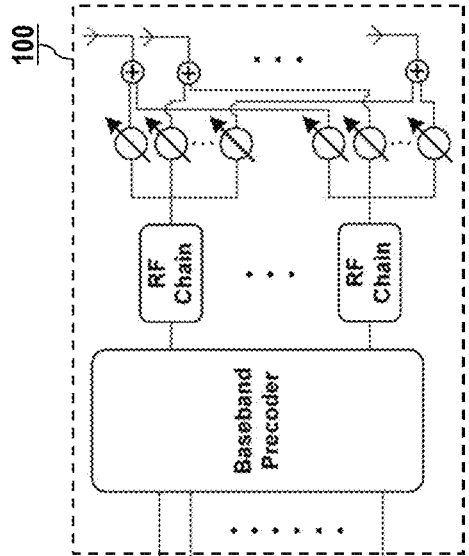
FIG. 2 is a schematic block diagram of a base station and a user equipment having a hybrid beamforming architecture.

For a clearer understanding of the features and advantages of the present disclosure, exemplary embodiments of the present disclosure will be described in detail with reference to the accompanied drawings. However, it should be understood that the present disclosure is not limited to particular embodiments disclosed herein but includes all modifications, equivalents, and alternatives falling within the spirit and scope of the present disclosure. In the drawings, similar or corresponding components may be designated by the same or similar reference numerals.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

In the description of exemplary embodiments of the present disclosure, "at least one of A and B" may mean "at least one of A or B" or "at least one of combinations of one or more of A and B". In addition, in the description of exemplary embodiments of the present disclosure, "one or more of A and B" may mean "one or more of A or B" or "one or more of combinations of one or more of A and B".

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

Exemplary embodiments of the present disclosure will now be described in detail with reference to the accompanying drawings. In order to facilitate general understanding in describing the present disclosure, the same components in the drawings are denoted with the same reference signs, and repeated description thereof will be omitted.

A channel environment and assumptions considered in and exemplary embodiment will be described prior to describing a signal transmitting and receiving method according to the exemplary embodiment of the present disclosure.

FIG. 1 is a schematic diagram of a wireless communication system according to an exemplary embodiment of the present disclosure. The wireless communication system may include a base station 100 and K user equipment 120A-120K. The base station 100 can simultaneously communicate with multiple users, i.e. the K user equipment 120A-120K. In particular, the base station 100 and the user equipment 120A-120K may be connected through a single-cell multiple-user multiple-input multiple-output (MU-MIMO) downlink channels. In such a communication environment, the base station 100 may transmit signals using multiple antennas, and the user equipment 120A-120K may receive signals using multiple antennas. Although just a single cell is shown in FIG. 1 for simplicity, the signal transmitting and receiving method of the present disclosure may be applicable to a system including a plurality of cells.

Meanwhile, although only downlink channels are shown in FIG. 1, the present disclosure may be applicable similarly to uplink channels.

It is assumed that a transmitting stage, i.e., the base station 100, and a receiving stage, i.e., the user equipment 120A-120K, in the system of FIG. 1 know complete channel state information. The base station 100 may obtain the channel state information by transmitting a sounding packet or a pilot signal to the user equipment 120A-120K and receiving the channel state information (CSI) from the user equipment 120A-120K. As will be described below, the channel state information (CSI) may be used to set a precoding matrix for a subsequent data transmission and to form a beam. Since the channel characteristics are reciprocal, the downlink channel and the uplink channel have the same characteristics as each other. Therefore, the channel state information for the downlink channel may also be used for the uplink channel.

The base station 100 may include a two-dimensional planner antenna array in which a very large number of antenna elements are integrated to form a two-dimensional plane. In order to reduce the implementation cost and the power consumption, the base station 100 has a hybrid beamforming architecture which uses both the digital beamforming and the analog beamforming. In the hybrid beamforming system, the digital beamforming may involve fewer RF chains than the number of the antenna elements and adjust an amplitude and phase of a signal in the baseband, and the analog beamforming adjusts the signal by phase shifters between the RF chains and the antenna elements. In addition, the base station 100 may have a fully-connected hybrid beamforming architecture where all the RF chains are connected to the antenna elements or a subarray-based hybrid beamforming architecture where each RF chain is connected to only a subset of the available antennas. Here, an antenna subset connected to each RF chain may be referred to as a sub-array antenna. Each user equipment 120A-120K may use a relatively much smaller number of antennas than the base station 100, and thus may have a fully-connected hybrid beamforming architecture having the same number of the RF chains as the antennas.

For example, assuming that $M_{RF}$ denotes the number of RF chains of the base station and $M_A$ denotes the number of antennas connected to each RF chain of the base station, a total number of antennas of the base station is $M_A M_{RF}$. Here, it is assumed that the number of RF chains ($M_{RF}$) is greater than or equal to the number of the user equipment (K) (i.e., $M_{RF} \geq K$). In case where $M_A = 1$, the number of RF chains ($M_{RF}$) is equal to the number of the user equipments (K), and the base station hybrid beamforming system has the full-digital architecture. Meanwhile, in each of the user equipment 120A-120K having the digital beamforming structure, it is assumed that both the number of RF chains and the number of antennas are the same as N. On the other hand, it can be said that the number of antennas of the base station 100 is generally much larger than the number of antennas of each user equipment, the number of RF chains of the base station and $M_A$ may satisfy a relationship: $M_A M_{RF} \gg N$.

A channel $H_k$ between the base station and the k-th user equipment may be determined based on a ray-tracing and may be expressed by Equation 1.

$$H_k = \sqrt{\frac{M_A M_{RF}}{N_p}} \sum_{i=1}^{N_p} a_i^k a_{MS}(\theta_i^r, \phi_i^r) a_{BS}^*(\theta_i^t, \phi_i^t) \qquad \text{[Equation 1]}$$

Here, $N_p$ denotes a total number of effective signal paths, $$(\theta_i^r, \phi_i^r)$$

denotes an angle-of-arrival (AoA) at the receiving stage of a k-th user equipment, and $$(\theta_i^t, \phi_i^t)$$

denotes an angle-of-departure (AoD) at the transmitting stage of the base station. $a_{MS}(\bullet)$ and $$a_{BS}^*(\cdot)$$

denote responses of the array antenna in the user equipment and the base station, respectively, and $$\alpha_i^k$$

denotes an amplification gain or a degree of attenuation (i.e., path loss) of the i-th signal path among the channels for the k-th user. It is assumed that the distributions of $$(\theta_i^r, \phi_i^r)$$

and $$(\theta_i^t, \phi_i^t)$$

are determined by probability distributions for the angle-of-arrival (AoA) and the angle-of-departure (AoD), respectively. It is further assumed that the probability distributions the angle-of-arrival (AoA) and the angle-of-departure (AoD) follow a Laplacian distribution. However, the system modeling and method according to the exemplary embodiments may be applicable even if the angle-of-arrival (AoA) and the angle-of-departure (AoD) follow different probability distributions.

According to an exemplary embodiment, the transmitter (e.g., the base station 100 in the case of the downlink transmission shown in FIG. 1) splits each data stream into a common stream and a private stream and transmits the common stream and the private stream in a state of being overlapped with each other. The common stream refers to an independent data stream that all users must commonly decode, and the private stream refers to a data stream to be delivered only to a relevant receiver. Each of the user equipment 120A-120K decodes a received signal using the common stream by a successive interference cancellation (SIC) scheme. That is, each user equipment 120A-120K may first decode the common stream before decoding its private stream, subtract a contribution of the common stream from the received signal, and then decode the private stream while treating private streams for other user equipment as an interference or noise. The transmitter may maximize a transmission data rate by appropriately adjusting numbers of the common streams and the private streams. Such a successive interference cancellation scheme may be implemented with low complexity since a search space is not infinite but has a finite size that is given as a function of the number of the RF chains.

Figure 3A:
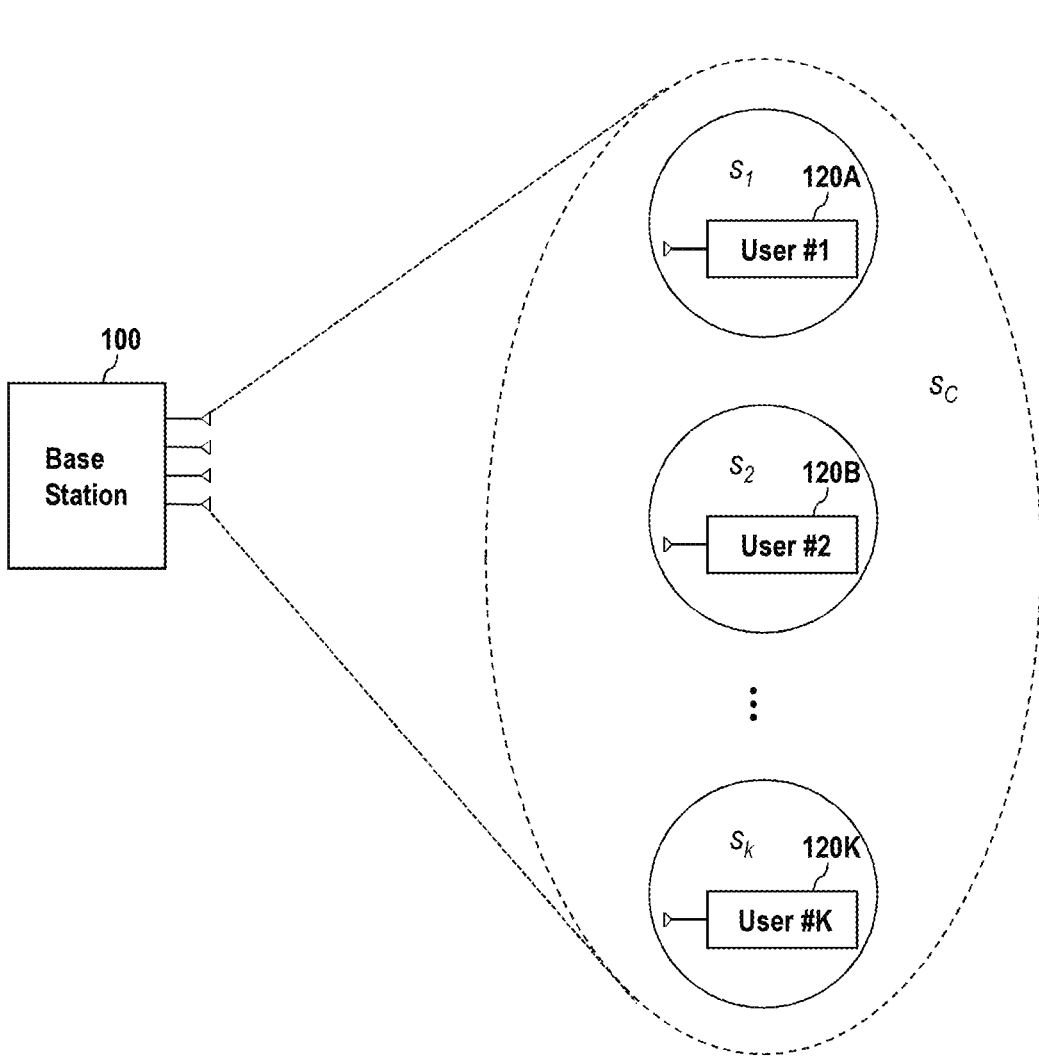
FIG. 3A illustrates an example of a message splitting model in which a depth of a common stream layer is one.
Figure 3B:
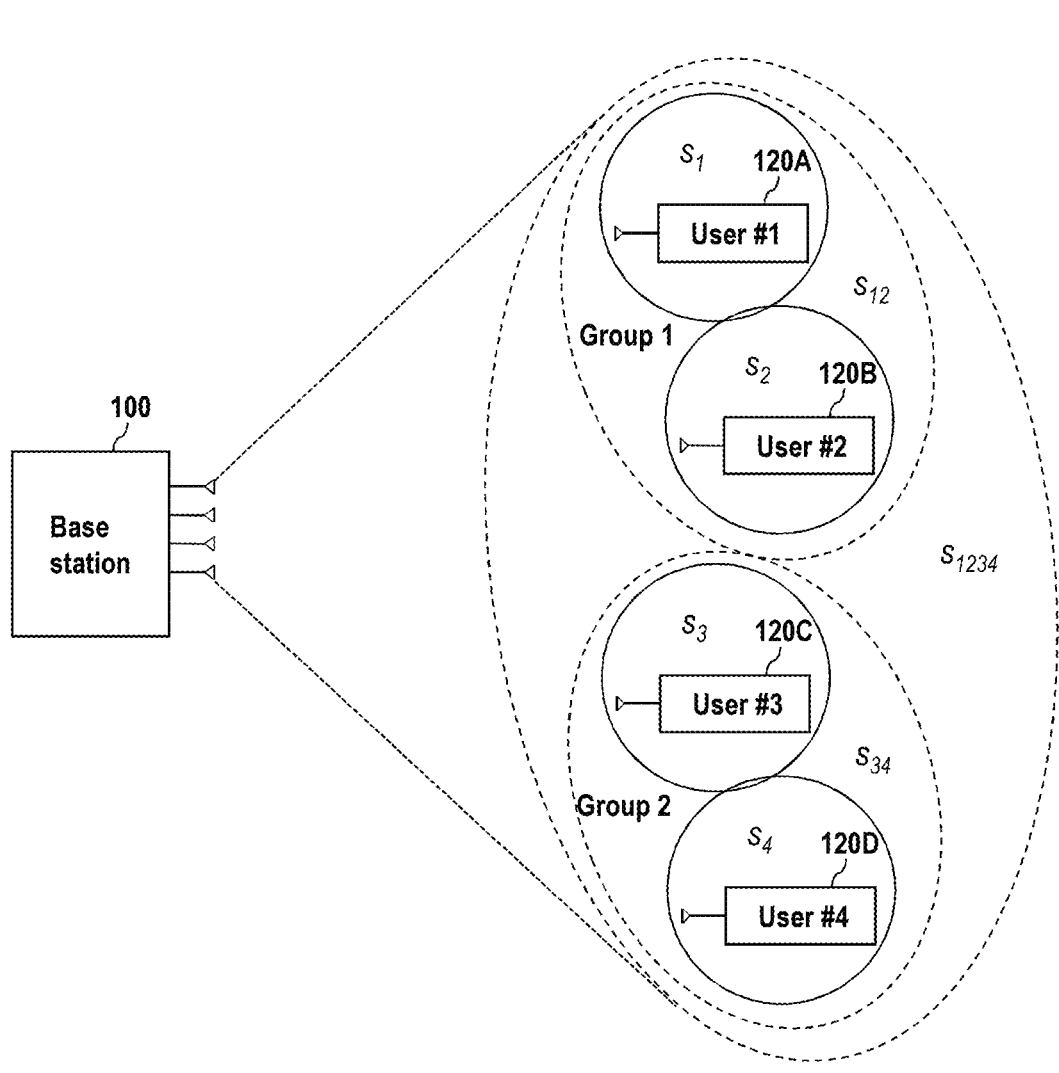
FIG. 3B illustrates an example of the message splitting model in which the depth of the common stream layers is two.

The decoding range of the common stream may be scheduled more specifically through a setting of a common stream layer. The common stream layer determines a range of users to which the common stream applies. For example, in an example of FIG. 3A where only a single common stream layer is set, and the common stream may apply to all users. In this case, all users may have to decode the common stream ($s_c$) even when the corresponding stream is not directed to the user. Meanwhile, two or more common stream layers may be hierarchically set. FIG. 3B illustrates an example of the message splitting model in which a depth of the common stream layers is two. There also may exist a common stream ($s_{1234}$) that is applied to all users in the example shown in FIG. 3B. However, all users may be divided into two groups, and the common streams each of which is common only to respective user groups may be set additionally. In FIG. 3B, the common stream ($s_{12}$) is a message stream regarded as the common stream only for a first and a second user equipment 120A and 120B, and the common stream ($s_{34}$) is a message stream regarded as the common stream only for a third and a fourth user equipment 120C and 120D. Since the common stream ($s_{34}$) is regarded as the private stream by the first and the second user equipment 120A and 120B, the first and the second user equipment 120A and 120B may treat the common stream ($s_{34}$) as the noise in the same way as the irrelevant private streams. Even through the numbers and the depths of the common stream layers may be set arbitrarily according to the present disclosure, it is assumed hereinbelow that the depth of the common stream layer is one for simplicity.

When the number of the common streams for the i-th user is $d_{[c],i}$, and the number of the private streams for the i-th user is $d_{[p],i}$, a total number of streams for the i-th user, $d_i$, should be less than or equal to the number of RF chains of the receiver to enable decoding of the streams at the receiver of the i-th user. That is, a condition $d_i = d_{[c],i} + d_{[p],i} \leq N$ must be satisfied. Meanwhile, in order for the base station to transmit the data streams to the users, a total number of the streams for all users must be less than or equal to the number of RF chains of the base station. That is, a condition of $$\sum_{i=1}^{K} d_i \leq M_{RF}$$

must be satisfied. To summarize, when the total number of the streams ($d_i$) for the i-th user is to be set, the following conditions must be satisfied.

$$d_i = d_{[c],i} + d_{[p],i} \leq N \qquad \text{[Equation 2]}$$

$$\sum_{i=1}^{K} d_i \leq M_{RF}$$

Figure 4:
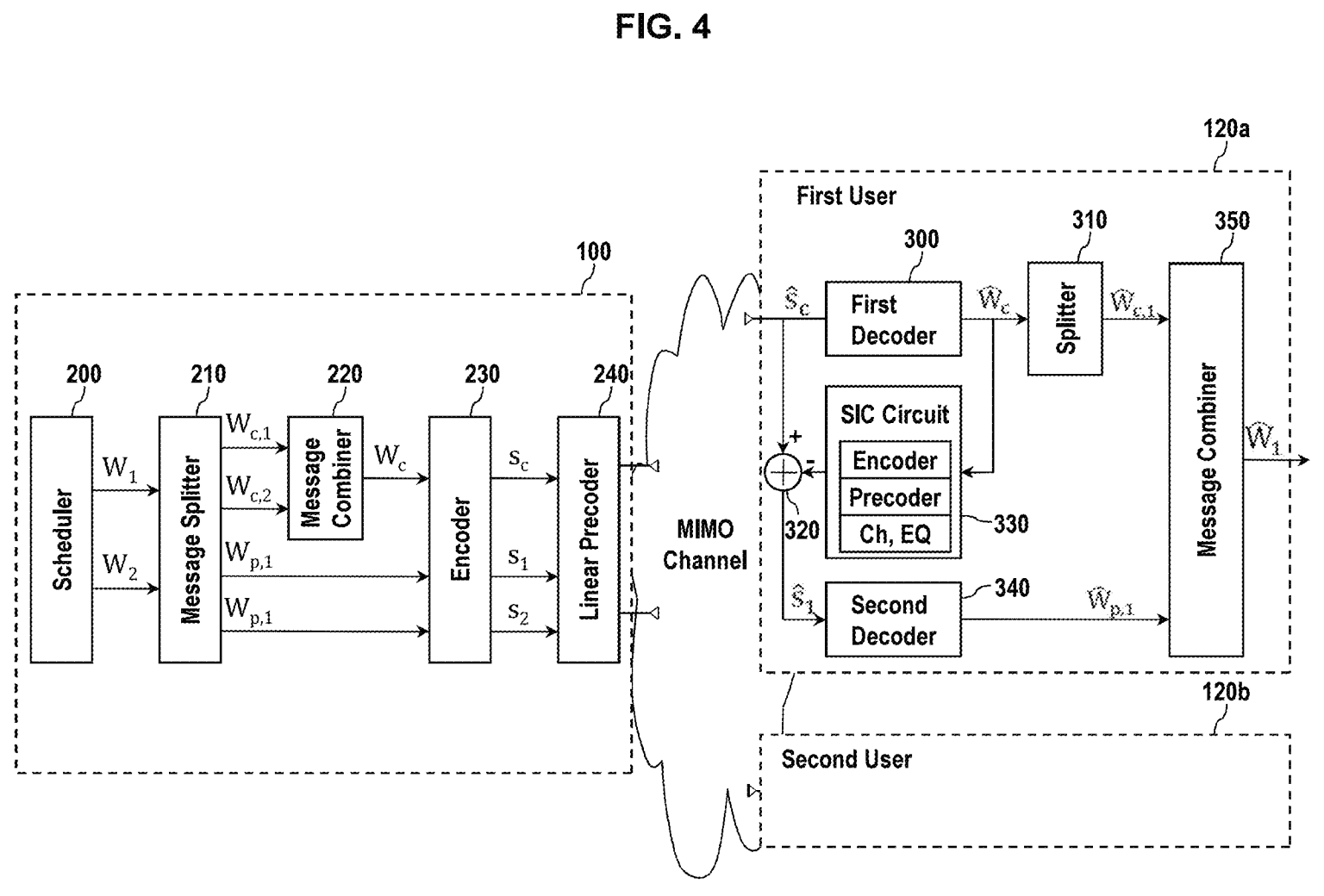

In the hybrid beamforming system according to an exemplary embodiment of the present disclosure, a transmitter channel encoder and a receiver channel decoder may have a configuration shown in FIG. 4. Since only the downlink channel is considered in the drawing, the transmitter may represent the transmitter of the base station 100 and the receivers may represent the receivers of the user equipment 120A and 120B. It is assumed here that there are only two users.

The channel encoder of the base station 100 may include a scheduler 200, a message splitter 210, a message combiner 220, an encoder 230, and a linear precoder 240. In addition, the hybrid beamforming apparatus of the base station 100 may include a modulator (not shown) and an amplifier (not shown) for each RF chain, and antennas.

The scheduler 200 determines a message data transmission schedule for each user equipment and outputs message streams W1 and W2. Here, the message stream W1 denotes a message stream to be transmitted to a first user, i.e., the first user equipment 120A, and the message stream W2 denotes a message stream to be transmitted to a second user, i.e., the second user equipment 120B.

The message splitter 210 may split the message for each user on a message stream basis into the common message stream and the private message stream. That is, the message splitter 210 may split the message stream W1 for the first user into a common message stream Wc,1 and a personal message stream Wp,1. Similarly, the message splitter 210 may split the message stream W2 for the second user into a common message stream Wc,2 and a personal message stream Wp,2.

The message combiner 220 may combine common message streams for a plurality of users into a single common message stream Wc. In the example illustrated in the drawing, the message combiner 220 may combine the common message stream Wc,1 for the first user and the common message stream Wc,2 for the second user to produce a single common message stream Wc. The term 'single stream' used herein may indicate one stream in terms of semantics and actually may be transmitted in a plurality of frames or packets.

The encoder 230 may encode each common message stream and each private message stream. For example, the encoder 230 may encode the common message stream Wc to output an encoded common stream sc. The encoder 230 may encode the private message stream Wp,1 for the first user to output an encoded private stream s1. The encoder 230 may encode the private message stream Wp,2 for the second user to output an encoded private stream s2. Accordingly, the entire data streams to be transmitted through the antenna elements may include s=[sc, s1, s2].

The linear precoder 240 may adjust amplitudes and phases of symbols included in data streams with reference to the channel state information for each user. Precoded symbols are converted into RF signals by the modulators (not shown), phase-adjusted, and then output through MIMO channels by the antennas.

On the other hand, on the user side, the channel decoder of the first user equipment 120A may include a first decoder 300, a splitter 310, a successive interference cancellation (SIC) circuit 320, a subtractor 330, a second decoder 340, and a message combiner 350. In addition, the hybrid beamforming apparatus of the first user equipment 120A may include antennas, and an amplifier (not shown) and a demodulator (not shown) for each RF chain.

The first decoder 300 may decode a received signal including the encoded common stream $\hat{s}_c$ while neglecting the encoded private stream components $\hat{s}_1$ and $\hat{s}_2$ as the interference or noise to reconstruct the common message stream $\hat{W}_c$. The splitter 310 may separate the common message stream $\hat{W}_{c,1}$ for the first user from the common message stream $\hat{W}_c$ while excluding the common message stream $\hat{W}_{c,2}$ for the other user.

The SIC circuit 320 may re-encode a reconstructed common message stream $\hat{W}_c$, precode a re-encoded common message stream, and equalize a precoded message under a condition being same as the channel condition to reconstruct a received signal component corresponding to the reconstructed common message stream $\hat{W}_c$. The subtractor 330 may subtract the received signal component corresponding to the reconstructed common message stream $\hat{W}_c$ from the received signal, thereby excluding the contribution of the common message stream from the received signal. Accordingly, an output signal of the subtractor 330 includes the encoded private streams $\hat{s}_1$ and $\hat{s}_2$ for the users.

The second decoder 340 may decode the output signal of the subtractor 330 while treating the private stream component $\hat{s}_2$ for another user (e.g., the second user) in the output signal of the subtractor 330 as the interference or noise to reconstruct a private message stream $\hat{W}_{p,1}$ for the first user.

The message combiner 350 may combine the common message stream $\hat{W}_{c,1}$ for the first user and the private message stream $\hat{W}_{p,1}$ for the first user to reconstruct the message stream $\hat{W}_1$ for the first user.

Meanwhile, in the system of FIG. 4, a power distribution may be achieved among all the message streams such that the power of each message stream may be the same as each other. That is, if a total power at the transmitting stage of the base station is P, the power of each message stream may be $$PP/\sum_{i=1}^{K} d_i.$$

A transmit signal vector (x) at the transmitting stage of the base station may be expressed as follows.

$$x = \sum_{i=1}^{K} (V_{[c],i}s_{[c],i} + V_{[p],i}s_{[p],i}) \qquad \text{[Equation 3]}$$

At this time, a common stream vector may be represented by $s_{[c],i}=[s_{[c],i,1} \cdots s_{[c],i,d_{[c],i}}]^T$, and a private stream vector may be represented by $s_{[p],i}=[s_{[p],i,1} \cdots s_{[p],i,d_{[p],i}}]^T$. Here, $s_{[c],i,j}$ denotes a j-th common stream of the i-th user, and $s_{[p],i,j}$ denotes a j-th private stream of the i-th user. In addition, $V_{[c],i}$ denotes a beamforming matrix of the base station for transmitting the common stream of the i-th user, and $V_{[p],i}$ denotes a beamforming matrix of the base station for transmitting the private stream of the i-th user.

When the transmission stage of the base station sets the transmit signal vector (x) by the Equation 3, the received signal vector at the signal reception stage of the j-th user equipment may be expressed by Equation 4. In the Equation 4, desired signal components to be decoded by each user equipment and the signals to be treated as the interference or noise are divided into separate terms to assist a better understanding of the equation. $z_j$ denotes a thermal noise vector at the j-th user equipment.

$$y_j = H_j x + z_j = H_j \sum_{i=1}^{K} (V_{[c],i}s_{[c],i} + V_{[p],i}s_{[p],i}) + z_j = \qquad \text{[Equation 4]}$$

$$H_j \sum_{i=1}^{K} (V_{[c],i}s_{[c],i}) + H_j V_{[p],j}s_{[p],j} + H_j \sum_{i=1,i\neq j}^{K} (V_{[p],i}s_{[p],i}) + z_j$$

The first two terms in the Equation 4 represent desired signals to be decoded, and the last two terms are components to be treated as the interference or noise. Expansion of this equation may result in a following equation.

[Equation 5]

$$y_j =$$

$$H_j \sum_{i=1}^{K}(V_{[c],i}s_{[c],i}) + H_j V_{[p],j}s_{[p],j} + H_j \sum_{i=1,i\neq j}^{K}(V_{[p],i}s_{[p],i}) + z_j =$$

$$H_{[d],j}\begin{bmatrix} s_{[c],1} \\ s_{[c],2} \\ \vdots \\ s_{[c],K} \end{bmatrix} + H_{[p],j}s_{[p],j} + H_{[I],j}\begin{bmatrix} s_{[p],1} \\ \vdots \\ s_{[p],j-1} \\ s_{[p],j+1} \\ \vdots \\ s_{[p],K} \end{bmatrix} + z_j$$

where $$H_{[d],j} = [H_j V_{[c],1} \ \ldots \ H_j V_{[c],K}]$$

$$H_{[p],j} = H_j V_{[p],j}$$

$$H_{[I],j} = [H_j V_{[p],1} \ \ldots \ H_j V_{[p],j-1} \ H_j V_{[p],j+1} \ \ldots \ H_j V_{[p],K}]$$

$H_{[d],j}$ denotes an effective channel matrix related to the common streams to be decoded by the j-th user, $H_{[p],j}$ denotes an effective channel matrix related to the private streams to be decoded by the j-th user, and $H_{[I],j}=[H_j V_{[p],1} \cdots H_j V_{[p],j-1} \ H_j V_{[p],j+1} \cdots H_j V_{[p],K}]$ denotes an effective channel matrix related to the private streams of the other users that the j-th user has to treat as the interference or noise.

Each receiver first decodes the common streams while treating both its private streams and the private streams of the other users as the interference or noise. Therefore, the transmission data rate for the common streams achievable by the j-th user may be calculated by Equation 6.

[Equation 6]

$$R_{[c],j} = \frac{d_{[c],j}}{\sum_{i=1}^{K}d_{[c],i}} \times$$

$$\log_2 \left( \frac{\left| I_N + \frac{P}{\sum_{i=1}^{K}d_i}H_{[d],j}H_{[d],j}^* + \frac{P}{\sum_{i=1}^{K}d_i}H_{[p],j}H_{[p],j}^* + \frac{P}{\sum_{i=1}^{K}d_i}H_{[I],j}H_{[I],j}^* \right|}{\left| I_N + \frac{P}{\sum_{i=1}^{K}d_i}H_{[p],j}H_{[p],j}^* + \frac{P}{\sum_{i=1}^{K}d_i}H_{[I],j}H_{[I],j}^* \right|} \right)$$

In deriving the Equation 6, it is assumed that the receiver is a Maximal Likelihood (ML) receiver. However, the present disclosure is not limited thereto, and other MIMO receivers such as a Minimum Mean Square Error (MMSE)-Continuous Interference Cancellation (SIC) receiver and an Integer-Forcing Receiver may be used as well. For each receiver type, the achievable data rate can be determined easily. Here, $I_N$ denotes an identity matrix of a size N×N, [•] denotes a determinant of the given matrix, and A* denotes a complex conjugate transpose of a matrix A. Also, the reason why the total data rate is multiplied by $$\frac{d_{[c],j}}{\sum_{i=1}^{K}d_{[c],i}}$$

is that the data stream for the j-th user is $d_{[c],j}$ data streams out of the total number of the common streams $$\sum_{i=1}^{K}d_{[c],i}$$

even though each user decodes all the common stream,

After decoding all the common streams, the receiver of the j-th user performs the SIC operation of subtracting all contributions of the common streams from the received signal (yj). Then, the receiver of the j-th user may decode its private streams while treating all the private streams of the other users as the interference or noise. The data rate of the private stream achievable by the j-th user may be calculated by Equation 7.

[Equation 7]

$$R_{[p],j} = \log_2 \left( \frac{\left| I_N + \frac{P}{\sum_{i=1}^{K}d_i}H_{[p],j}H_{[p],j}^* + \frac{P}{\sum_{i=1}^{K}d_i}H_{[I],j}H_{[I],j}^* \right|}{\left| I_N + \frac{P}{\sum_{i=1}^{K}d_i}H_{[I],j}H_{[I],j}^* \right|} \right)$$

It can be seen in the Equation 7 that the total noise experienced during the decoding of the private streams is reduced owing to the SIC operation for the common stream. This feature may result in a higher performance compared to a case where the common stream is not introduced depending on the channel environment. As a correlation between the channels of the users increases, the advantage of the introduction of the common stream may increase further. However, repetitive applications of the common streams does not guarantee the improvement of the performance.

A final data rate (Rj) that the j-th user can achieve may be expressed by Equation 8.

$$R_j = \min_j R_{[c],j} + R_{[p],j}$$

[Equation 8]

Here, the reason why a minimum data rate among the users $$\min_j R_{[c],j}$$

is considered when calculating the data rate for the common streams is that the common streams are streams that all the users have to complete a successful decoding. The above data rate may be varied depending on the numbers of the common streams and the private streams and may be optimized under the condition of the Equation 2 to achieve the highest data rate.

A beamforming method for applying the above signal transmitting and receiving method based on the message splitting to the hybrid beamforming will now be described. A common beamforming matrix $V_{[c],i}$ and a private beamforming matrix $V_{[p],i}$ for the i-th user may be expressed as follows.

$$V_{[c],i}=W_{[c],i}U_{[c],i}, \ V_{[p],i}=W_{[p],i}U_{[p],i} \quad \text{[Equation 9]}$$

Here, $W_{[c],i}$ and $W_{[p],i}$ denote analog beamforming matrices between the RF chain and the antenna element, and $U_{[c],i}$ and $U_{[p],i}$ denote digital beamforming matrices in the baseband.

Assuming that the analog beamforming matrices $W[_{[c],i}$ and $W_{[p],i}$ are determined as arbitrary values, the digital beamforming matrices $U_{[c],i}$ and $U_{[p],i}$ may be set as follows.

First, a method for determining a digital beamforming matrix $U_{[p],i}$ for the private stream will be described. The digital beamforming matrix $U_{[p],i}$ for the private stream may be set by a linear combination of a singular-value decomposition (SVD) beamforming matrix and a zero-forcing (ZF) beamforming matrix as shown in Equation 10.

$$U_{[p],i}=(1-\alpha)\bar{A}_{[p],i}+\alpha\bar{B}_{[p],i} \quad \text{[Equation 10]}$$

Here, $\bar{A}_{[p],i}$ is set to a right unitary matrix obtained by the SVD of $\bar{H}_{[p],i,i}=H_j W_{[p],i}$, and $\bar{B}_{[p],i}$ is a ZF beamforming matrix satisfying Equation 10 below.

$$\bar{B}_{[p],i}\in \text{null}([\bar{H}^T_{[p],1,i} \dots \bar{H}^T_{[p],i-1,i} \bar{H}^T_{[p],i+1,i} \dots \\ \bar{H}^T_{[p],K,i}]^T) \quad \text{[Equation 11]}$$

In the Equation 10, $\alpha$ is a real number between 0 and 1 and may be optimized numerically. The inventors found through experiments that it is sufficient to change a candidate of $\alpha$ by an interval of 0.25. In the case of the private stream, the data rate of the entire system may be maximized when the private stream is delivered to the corresponding user in a maximum, and at the same time is not delivered or is delivered in a minimum to the other users. Therefore, the digital beamforming matrix for the private stream is set to the linear combination of the SVD beamforming matrix allowing to transmit the private stream to the corresponding user in the maximum and the ZF beamforming matrix prevent the transmission of the private stream to other users. Additionally, a process of normalizing a size (i.e., norm) of each column of the digital beamforming matrix $U_{[p],i}$ to 1 may be performed to satisfy a constraint on a maximum power.

Meanwhile, the digital beamforming matrix $U_{[c],i}$ for the common stream may be set to a right unitary matrix obtained by the SVD of $[\bar{H}_{[c],1,i} \dots \bar{H}_{[c],K,i}]$ taking it into account that the common streams must be decoded by all the users. Here, $\bar{H}_{[c],i,i}$ is an effective channel matrix of each user after the analog beamforming and is given by $\bar{H}_{[c],i,i}=H_i W_{[c],i}$.

Next, a method of setting the analog beamforming will be described. According to an exemplary embodiment, the same analog beamforming is applied to both the private stream and the common stream. That is, beamforming is set to satisfy $W_{[c],i}=W_{[p],i}=W_i$ for all users.

First, the analog beamforming technique in the case of using the fully-connected hybrid beamforming architecture in which all the RF chains are connected to the antenna elements will be described. In this case, an entire analog beamforming matrix $W=[W_1, W_2, \dots, W_K]$ may be set by obtaining the right unitary matrix by the SVD of the entire channel matrix $\{H_1, H_2, \dots, H_K\}$ and taking only phase values from elements of the right unitary matrix. Accordingly, each element of the analog beamforming matrix W has the same phase as each element of the right unitary matrix of the entire channel matrix $\{H_1, H_2, \dots, H_K\}$, and has a magnitude of 1. The reason of setting the analog beamforming matrix in such a manner is as follows: if the number of antennas of the base station is very large and if there is no constraint that the size of each element of the analog beamforming matrix is 1 (i.e., the size is unconstrained), the right unitary matrix is the optimal solution for maximizing the data rate, and if the size of each element of the analog beamforming matrix is 1, taking only the phase of the right unitary matrix may result in a solution which is closest to the optimal solution. The analog beamforming matrix can be set since it is assumed that the base station has a sufficiently large number of antennas.

Next, the analog beamforming technique in the case of using the sub-connected architecture where each RF chain is connected to only a subset of the available antenna elements will be described. There may be three analog beamforming techniques for the sub-connected architecture.

According to a first method (hereinafter referred to as 'first sub-connected architecture scheme') which utilizes the beamforming matrix for the fully-connected architecture discussed above, the analog beamforming matrix is determined by multiplying the beamforming matrix for the fully-connected architecture by a block diagonal identity matrix that is determined according to the sub-connected architecture. The method is the simplest and is easy to implement because the analog beamforming matrix may be obtained by taking only some elements from the beamforming matrix for the fully-connected architecture. However, this method may show the performance inferior to that of the fully-connected architecture.

The second method (hereinafter referred to as 'second sub-connected architecture scheme') considers each sub-connected array as an independent transmitter and applies the beamforming matrix for the fully-connected architecture to channels of all users connected to the sub-connected array. In other words, the analog beamforming matrix for each sub-connected array may be set independently by applying the beamforming matrix for the fully-connected architecture assuming that all other sub-connected arrays do not exist.

The third method (hereinafter referred to as 'third sub-connected architecture scheme') applies a ray-tracing to channels of all users connected to each sub-connected array. In this case, it is assumed that the base station knows not only the channel information but also all the angles and intensities of the signal rays in each user channels of the users. Each sub-connected array may set the analog beamforming matrix such that angles of signal paths having the strongest intensity are selected as many as the number of data streams and the beam formed by the beamforming is aligned to that direction or those directions. In order to improve the performance, the angle of the signal path may be selected for each sub-connected array such that the over signal paths for the entire array antenna may be combined constructively.

Figure 5:
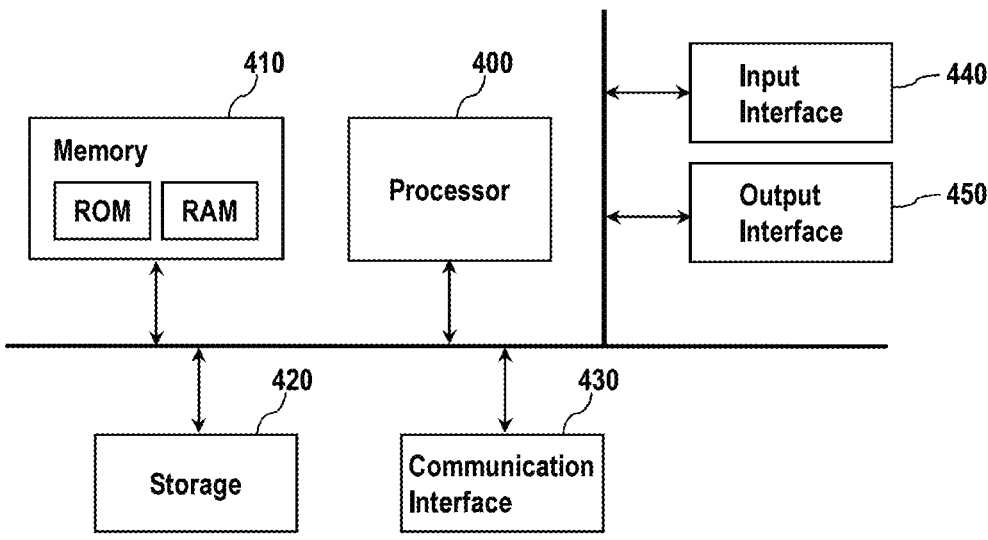
FIG. 5 is a block diagram showing a physical configuration of a signal transmitting and receiving apparatus of a base station to which exemplary embodiments of the present disclosure is applicable.

FIG. 5 is a block diagram showing a physical configuration of a signal transmitting and receiving apparatus of the base station to which exemplary embodiments of the present disclosure are applicable. Although the signal transmitting and receiving apparatus of the base station is shown in the drawing, a signal transmitting and receiving apparatus of a terminal may be configured similarly to the apparatus of FIG. 5.

The signal transmitting and receiving apparatus base station may include at least one processor 400, a memory 410, a storage 420, a communication interface 430, an input interface device 440, and an output interface device 450. The components of the signal transmitting and receiving apparatus including the processor 400 and the memory 410 may be connected to each other by a bus.

The processor 400 may execute program instructions stored in the memory 410 and/or the storage 420. The processor 400 may include a central processing unit (CPU) or a graphics processing unit (GPU), or may be implemented by another kind of dedicated processor suitable for performing the method of the present disclosure.

The memory 410 may include, for example, a volatile memory such as a read only memory (ROM) and a nonvolatile memory such as a random access memory (RAM). The memory 410 may load the program instructions stored in the storage 420 to provide to the processor 400 so that the processor 400 may execute the program instructions. When the program instructions are executed by the processor 400, the program instructions may cause the processor 400 to perform functions necessary to implement the hybrid beamforming including the channel encoding and the channel decoding illustrated in FIG. 4.

The storage 420 may include an intangible recording medium suitable for storing the program instructions, data files, data structures, and a combination thereof. Examples of the storage medium may include magnetic media such as a hard disk, a floppy disk, and a magnetic tape, optical media such as a compact disk read only memory (CD-ROM) and a digital video disk (DVD), magneto-optical medium such as a floptical disk, and semiconductor memories such as ROM, RAM, a flash memory, and a solid-state drive (SSD).

The communication interface 430 may perform communications with a core network including a switchboard, one or more repeaters, and nearby base stations. The input interface device 440 allows an operator or user to input manipulation commands or information, and the output interface device 450 displays an operating state or processing result of the signal transmitting and receiving apparatus.

The performance of the signal transmitting and receiving method found through a simulation will now be described. Simulation parameters were set such that: $M_{RF}=16$, $M_A=4$, $K=4$, $N=4$, $N_p=80$, and it was assumed that the angle of arrival (AoA), the angle of departure (AoD), and the spread angle (or angular spread) of each channel follow a truncated Laplacian distribution. In the following description and drawings, Case 1 represents a case where an azimuth angle is 60 degrees and the elevation angle is 20 degrees, and Case 2 represents a case where the azimuth angle is 120 degrees and the elevation angle is 20 degrees. Therefore, the Case 1 may be an environment where the correlation between user channels is higher than the Case 2.

A performance of the hybrid beamforming according to an exemplary embodiment (considering both the fully-connected architecture and the sub-connected architecture), the performance when only the private stream is sent (considering both the fully-connected architecture and the sub-connected architecture), the performance when only the common stream is sent (considering both the fully-connected architecture and the sub-connected architecture), the performance when only the private stream is sent and the number of streams for each user is fixed to $d_i=4$ (that is, private stream only without rank adaptation scheme, and considering both the fully-connected architecture and the sub-connected architecture), the performance in the case of the full digital beamforming with the same number of RF chains (that is, all the other parameters are the same, $M_A=1$. The number of the RF chains are the same as that in the hybrid beamforming according to an exemplary embodiment), the performance in the case of the full digital beamforming with the same number of antennas (that is, $M_{RF}=64$, $M_A=1$. The number of the antenna elements are the same as that in the hybrid beamforming according to an exemplary embodiment) were evaluated.

Figure 6A:
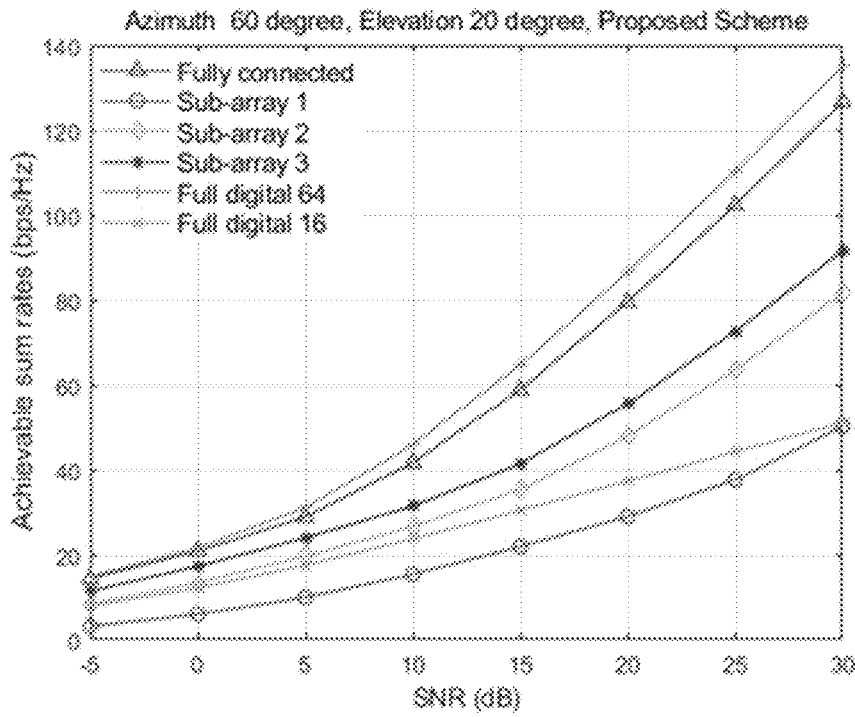
FIGS. 6A and 6B are graphs illustrating performance analysis results according to a connection architecture between RF chains and an array antenna.
Figure 6B:
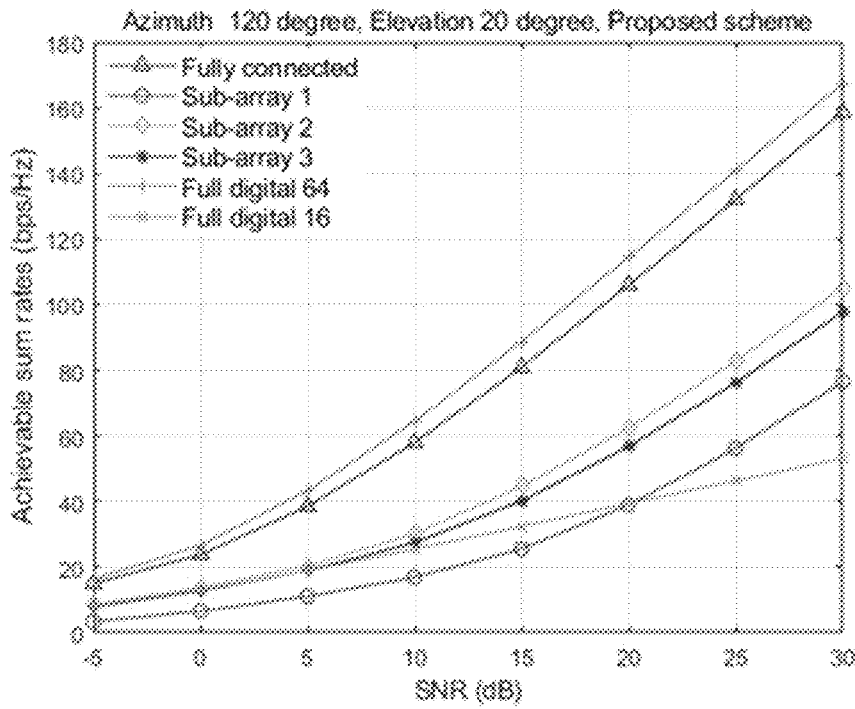

FIGS. 6A and 6B are graphs illustrating performance analysis results according to the connection architecture between the RF chains and the array antenna. It can be seen that the analog beamforming method in the fully-connected architecture according to the exemplary embodiment may achieve a performance similar to that of the full digital beamforming using 4 times more RF chains, that is, 64 RF chains. Therefore, the analog beamforming in the fully-connected architecture according to an exemplary embodiment may achieve a similar performance with a much smaller number of RF chains, and can be evaluated to be a very good technique. In addition, when FIGS. 6A and 6B are compared with each other, it can be found that the overall performance of all methods improves as the angular spread increases because the correlation between the user channels decreases. In addition, it can be found that the superiority in performance between the second and third sub-connected architecture schemes changes depending on the degree of correlation between the user channels.

Referring to FIGS. 6A and 6B, even in the case of the sub-connected architecture, the analog beamforming method according to an exemplary embodiment of the present disclosure shows a greatly improved performance compared to the full-digital method using the same number of RF chains. Since the installation of additional antennas is much simpler in terms of the implementation and costs and causes less power consumption than the installation of additional RF chain, the exemplary embodiment of the present disclosure may enhance the system performance with low cost and low complexity by adding the antenna elements only while maintaining the number of the RF chains. Finally, the first sub-connected architecture is simple to implement but shows an inferior performance to the fully-connected architecture. However, when the spread angle is small as in the case of FIG. 6A, the performance may be still high than the full digital beamforming scheme.

Figure 7A:
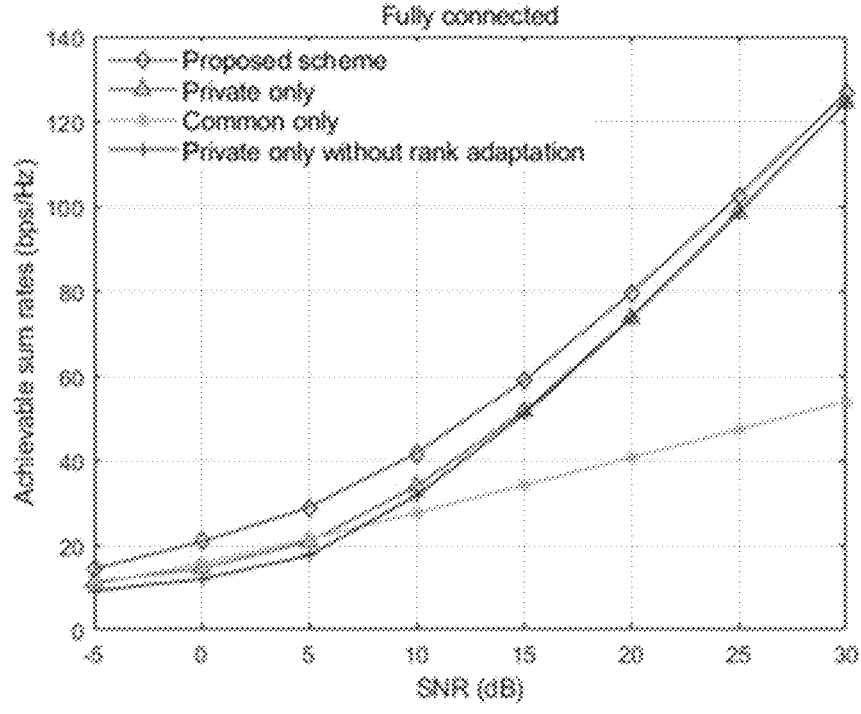
FIGS. 7A and 7B are graphs illustrating performance analysis results according to an example of a message splitting of Case 1 where an azimuth angle is 60 degrees and an elevation angle is 20 degrees.
Figure 7B:
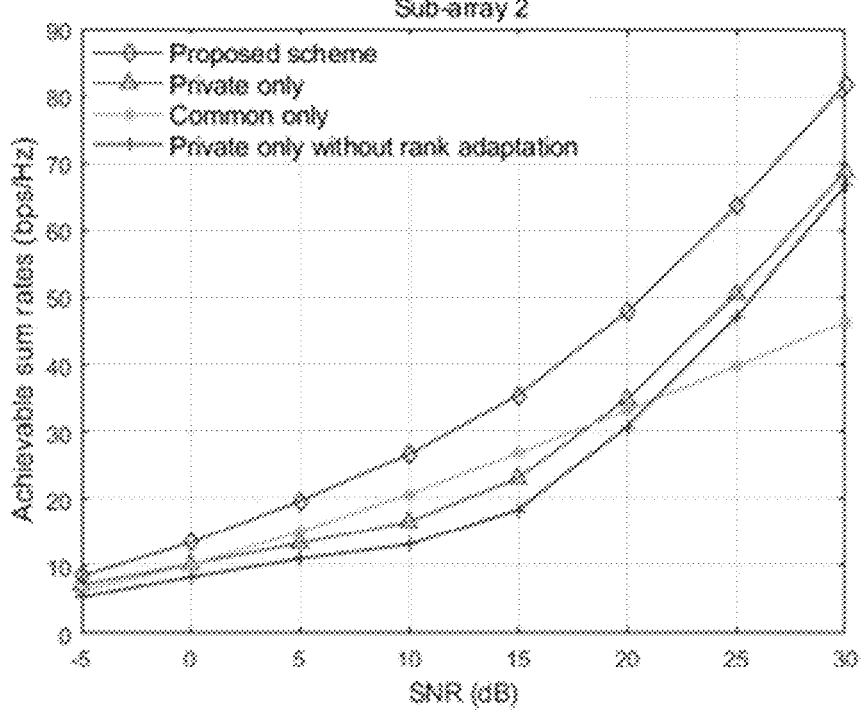

FIGS. 7A and 7B are graphs illustrating the performance analysis results according to an example of the message splitting of the Case 1 where the azimuth angle is 60 degrees and the elevation angle is 20 degrees. At this time, it is assumed that the analog beamforming method in the sub-connected architecture uses the second sub-connected architecture scheme, which showed the best performance in the Case 1. It can be seen in FIGS. 7A and 7B that the performance improved by the message splitting in both the fully-connected architecture and the sub-connected architecture. That is, according to an exemplary embodiment of the present disclosure, the performance improvement is assured compared to the conventional hybrid beamforming-based transmission using only the private stream.

In addition, it can be seen that the sub-connected architecture may bring about a higher gain caused by the message splitting than the fully-connected architecture. This is because, in the case of the sub-connected architecture, the optimality of the analog beamforming is degraded than that of the fully-connected architecture due to structural limitations, and a difference from the unconstrained beamforming increases. The simulation results show that the performance degradation may be overcome to some extent through the use of the common stream arising from the message splitting. Such a result is encouraging for an actual system implementation because, as the number of the antenna elements increases, it is more likely that the system is implemented based on the sub-connected architecture rather than the fully-connected architecture to reduce the implementation complexity and costs.

Figure 8A:
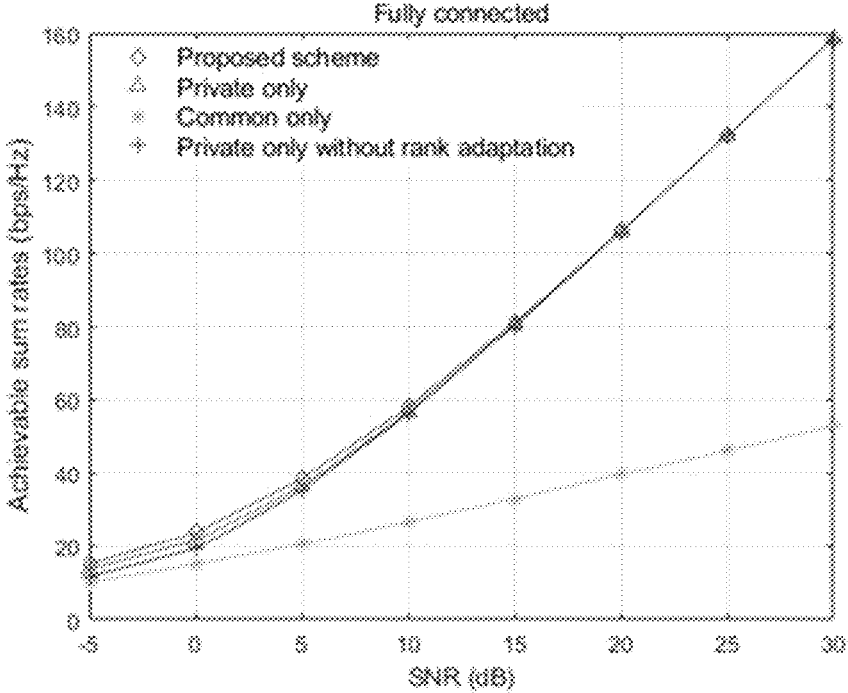
FIGS. 8A and 8B are graphs illustrating the performance analysis results according to another example of the message splitting of Case 2 where the azimuth angle is 120 degrees and the elevation angle is 20 degrees.
Figure 8B:
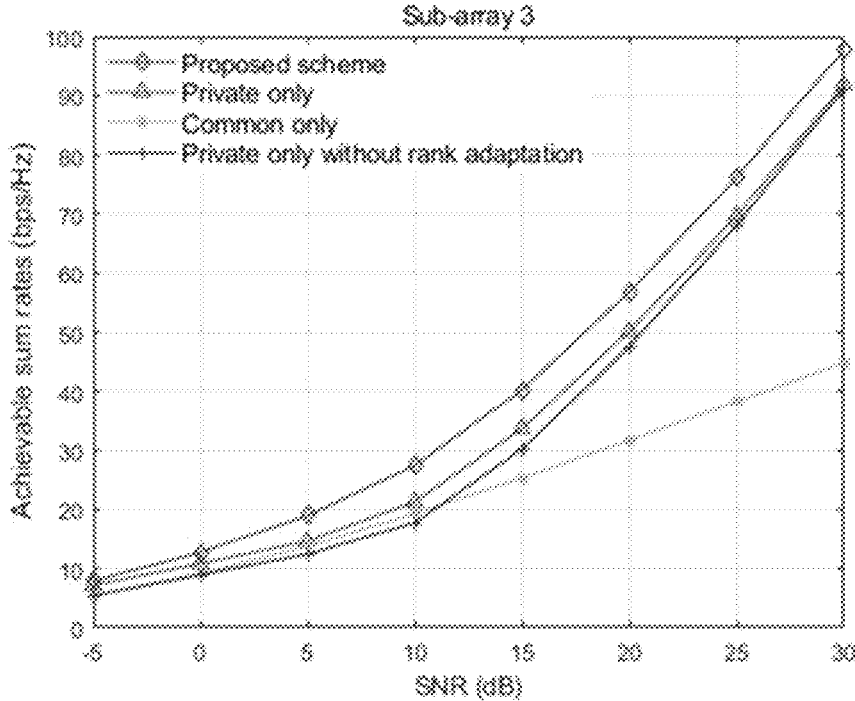

FIGS. 8A and 8B are graphs illustrating the performance analysis results according to the example of the message splitting of the Case 2 where the azimuth angle is 120 degrees and the elevation angle is 20 degrees. At this time, it is assumed that the analog beamforming method in the sub-connected architecture uses the third sub-connected architecture scheme, which showed the best performance in the Case 2. Comparing the performances illustrated in FIGS. 8A and 8B with those of FIGS. 7A and 7B, it can be seen that the overall gain after the message splitting is reduced due to an increase in the angular spread, that is, the decrease in the correlation between user channels. However, the sub-connected architecture still reveals a meaningful performance gain caused by the message splitting even when the correlation between user channels is small as shown in FIG. 8B.

A stream set may be configured as follows in an exemplary embodiment of the present disclosure.

Figure 9:
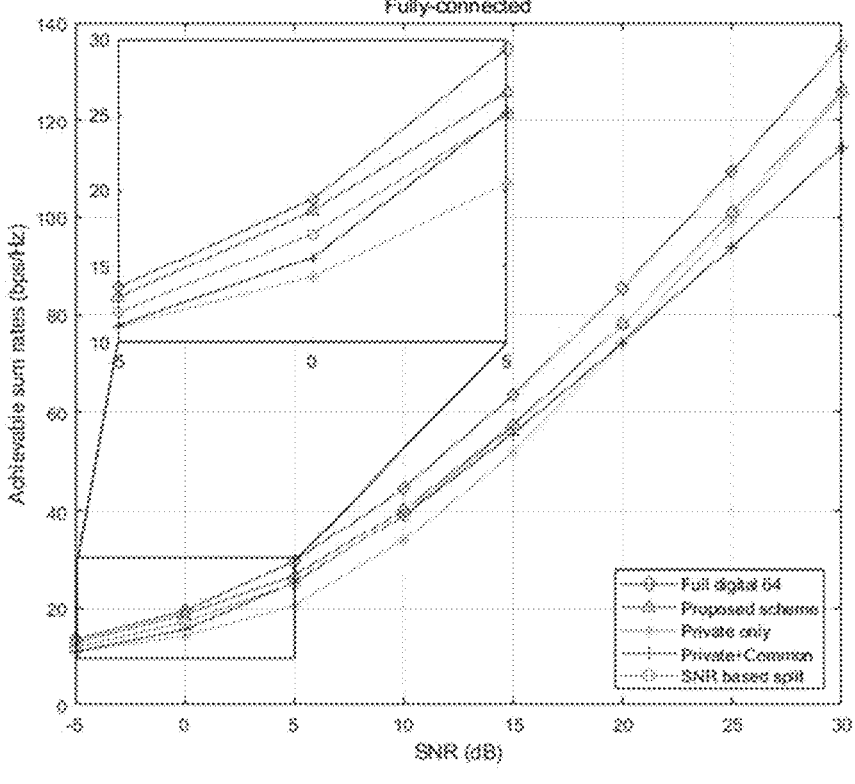
FIG. 9 is a graph illustrating performance analysis results for a low complexity stream set configuration scheme according to an exemplary embodiment of the present disclosure.

In setting an optimal stream set for the common stream and the private stream, the stream set setting may be adjusted according to the signal-to-noise ratio (SNR) without considering all cases satisfying the condition of the Equation 2. For example, the stream set may be configured with low complexity considering that the transmission of the common stream is relatively advantageous in a range of a lower SNR and transmission of the private stream is relatively advantageous in a range of a higher SNR. In detail, in a range of −5 dB≤SNR≤5 dB, the number of the private streams may be set to be smaller than the number of the common streams in the in a range of −5 dB≤SNR≤5 dB, while the number of the private streams may be set to be larger than the number of the common streams in a range of SNR≥10 dB. In an intermediate domain between the two ranges, all the possible cases may be considered. Such a technique may be referred to as an SNR split technique. As can be seen in FIG. 9, a low complexity stream set configuration scheme according to an exemplary embodiment of the present disclosure achieves an excellent performance close to an optimal result.

As mentioned above, the apparatus and method according to exemplary embodiments of the present disclosure can be implemented by computer-readable program codes or instructions stored on a computer-readable intangible recording medium. The computer-readable recording medium includes all types of recording device storing data which can be read by a computer system. The computer-readable recording medium may be distributed over computer systems connected through a network so that the computer-readable program or codes may be stored and executed in a distributed manner.

The computer-readable recording medium may include a hardware device specially configured to store and execute program instructions, such as a ROM, RAM, and flash memory. The program instructions may include not only machine language codes generated by a compiler, but also high-level language codes executable by a computer using an interpreter or the like.

Some aspects of the present disclosure described above in the context of the device may indicate corresponding descriptions of the method according to the present disclosure, and the blocks or devices may correspond to operations of the method or features of the operations. Similarly, some aspects described in the context of the method may be expressed by features of blocks, items, or devices corresponding thereto. Some or all of the operations of the method may be performed by use of a hardware device such as a microprocessor, a programmable computer, or electronic circuits, for example. In some exemplary embodiments, one or more of the most important operations of the method may be performed by such a device.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A signal transmitting method in a signal transmitter, comprising:

splitting each of plural message streams to be transmitted to a plurality of receivers into a common message stream and at least one private message stream in a unit of a message stream;

combining a plurality of common message streams for the plurality of receivers to generate a common stream;

encoding the common stream and private message streams for the plurality of receivers to generate an encoded common stream and encoded private message streams;

linearly precoding the encoded common stream and the encoded private message streams to adjust amplitudes and phases of symbols such that power is distributed in a predetermined manner between the encoded common stream and the encoded private message streams and generate precoded signals; and converting the precoded signals into a plurality of RF signals, adjusting phases of the plurality of RF signals, and outputting the plurality of phase-adjusted RF signals through a plurality of multi-input multiple-output (MIMO) antennas, wherein linearly precoding the encoded common stream and the encoded private message streams comprises:

generating a beamforming matrix for a private stream by generating a digital beamforming matrix for the private stream by a linear combination of a singular value decomposition (SVD) beamforming matrix and a zero forcing (ZF) beamforming matrix and normalizing a size of each column of the digital beamforming matrix to 1; and determining a right unitary matrix obtained by a singular value decomposition of an effective channel matrix of each user as a digital beamforming matrix for the common stream.

2. The signal transmitting method of claim 1, wherein a sum of a number of the common message streams and a number of the private message streams for each of the plurality of receivers is determined to be smaller than or equal to a number of RF chains of a corresponding receiver, wherein a sum of a number of common message streams for all the plurality of receivers and a number of private message streams for all the plurality of receivers is determined to be smaller than or equal to a number of RF chains of the signal transmitter.

3. The signal transmitting method of claim 2, further comprising:

before splitting each of the plural message streams to be transmitted, determining the receivers and adjusting a proportion of the common data stream and the private data streams according to a signal-to-noise ratio of a transmission channel.

4. The signal transmitting method of claim 1, wherein converting the precoded signals and outputting the plurality of phase-adjusted RF signals comprises:

setting an entire analog beamforming matrix by performing a singular-value decomposition (SVD) of an entire channel matrix to obtain a right unitary matrix and taking only phase values from elements of the right unitary matrix.

5. The signal transmitting method of claim 1, wherein converting the precoded signals and outputting the plurality of phase-adjusted RF signals comprises:

setting an analog beamforming matrix by multiplying a beamforming matrix for a fully-connected architecture by a block diagonal identity matrix determined according to a sub-connected architecture.

6. The signal transmitting method of claim 1, wherein converting the precoded signals and outputting the plurality of phase-adjusted RF signals comprises:

setting an analog beamforming matrix by performing a singular-value decomposition (SVD) of a channel matrix for a channel of all users connected to each of sub-connected arrays to obtain a right unitary matrix and taking only phase values from elements of the right unitary matrix.

7. The signal transmitting method of claim 1, wherein converting the precoded signals and outputting the plurality of phase-adjusted RF signals comprises:

setting an analog beamforming matrix for a channel connected to each sub-connected array by selecting angles of signal paths having strongest intensity as many as a number of data streams and aligning beam formed by the analog beamforming matrix to at least one direction corresponding to the angles.

8. A signal receiving method by a signal receiver to receive a signal transmitted by a signal transmitter and reconstruct a message stream for the signal receiver, comprising:

acquiring a receive signal through a multiple-input multiple-output (MIMO) antenna;

decoding the receive signal to reconstruct a common stream, the common stream being generated by the signal transmitter combining a plurality of common message streams for a plurality of signal receivers including the signal receiver;

separating a common message stream for the signal receiver from the common stream while excluding common message stream irrelevant to the signal receiver;

acquiring a private stream signal component by subtracting a contribution of the common message stream from the receive signal;

decoding the private stream signal component to recover a private message stream for the signal receiver; and combining the common message stream for the signal receiver and the private message stream for the signal receiver to reconstruct the message stream for the signal receiver, wherein in the receive signal, power is distributed in a predetermined manner between the common stream and a plurality of private message streams for the plurality of signal receivers, and wherein the common stream and the private message stream are included in the signal through encoding and linear precoding, and the linear precoding is performed at the signal transmitter by:

generating a beamforming matrix for a private stream by generating a digital beamforming matrix for the private stream through a linear combination of a singular value decomposition (SVD) beamforming matrix and a zero-forcing (ZF) beamforming matrix, and normalizing a magnitude of each column of the digital beamforming matrix to 1; and determining, as a digital beamforming matrix for a common stream, a right unitary matrix obtained by a singular value decomposition of an effective channel matrix of each user.

9. The signal receiving method of claim 8, wherein decoding the receive signal to reconstruct the common stream comprises:

decoding the receive signal while treating signal components caused by the private message stream and irrelevant to the signal receiver as an interference or noise.

10. The signal receiving method of claim 8, wherein decoding the private stream signal component to recover the private message stream for the signal receiver comprises:

decoding the private stream signal component while treating signal components for other signal receivers in the private stream signal component as an interference or noise.

11. The signal receiving method of claim 8, wherein acquiring the private stream signal component by subtracting the contribution of the common message stream from the receive signal comprises:

re-encoding a reconstructed common message stream, precoding a re-encoded common message stream, and equalizing a precoded message under a condition simulating an actual channel condition to generate the contribution of the common message stream from the receive signal.

12. A signal transmitting apparatus, comprising:

a memory having program instructions stored therein; and a processor coupled to the memory and configured to execute the program instructions stored in the memory, wherein the program instructions, when executed by the processor, are configured to cause the processor to:

split each of plural message streams to be transmitted to a plurality of receivers into a common message stream and at least one private message stream in a unit of a message stream;

combine a plurality of common message streams for the plurality of receivers to generate a common stream;

encode the common stream and private message streams for the plurality of receivers to generate an encoded common stream and encoded private message streams;

linearly precode the encoded common stream and the encoded private message streams to adjust amplitudes and phases of symbols such that power is distributed in a predetermined manner between the encoded common stream and the encoded private message streams and generate precoded signals; and convert the precoded signals into a plurality of RF signals, adjust phases of the plurality of RF signals, and output the plurality of phase-adjusted RF signals through a plurality of multi-input multiple-output (MIMO) antennas, wherein the program instructions causing the processor to linearly precode the encoded common stream and the encoded private message streams are configured to cause the processor to:

generate a beamforming matrix for a private stream by generating a digital beamforming matrix for the private stream by a linear combination of a singular value decomposition (SVD) beamforming matrix and a zero forcing (ZF) beamforming matrix and normalizing a size of each column of the digital beamforming matrix to 1; and determine a right unitary matrix obtained by a singular value decomposition of an effective channel matrix of each user as a digital beamforming matrix for the common stream.

13. The signal transmitting apparatus of claim 12, wherein a sum of a number of the common message streams and a number of the private message streams for each of the plurality of receivers is determined to be smaller than or equal to a number of RF chains of a corresponding receiver, wherein a sum of a number of common message streams for all the plurality of receivers and a number of private message streams for all the plurality of receivers is determined to be smaller than or equal to a number of RF chains of the signal transmitter.

14. The signal transmitting apparatus of claim 12, wherein the program instructions causing the processor to convert the precoded signals and output the plurality of phase-adjusted RF signals are configured to cause the processor to:

set an entire analog beamforming matrix by performing a singular-value decomposition (SVD) of an entire channel matrix to obtain a right unitary matrix and taking only phase values from elements of the right unitary matrix.

15. The signal transmitting apparatus of claim 12, wherein the program instructions causing the processor to convert the precoded signals and output the plurality of phase-adjusted RF signals are configured to cause the processor to:

set an analog beamforming matrix by multiplying a beamforming matrix for a fully-connected architecture by a block diagonal identity matrix determined according to a sub-connected architecture.

16. The signal transmitting apparatus of claim 12, wherein the program instructions causing the processor to convert the precoded signals and output the plurality of phase-adjusted RF signals are configured to cause the processor to:

set an analog beamforming matrix by performing a singular-value decomposition (SVD) of a channel matrix for a channel of all users connected to each of sub-connected arrays to obtain a right unitary matrix and taking only phase values from elements of the right unitary matrix.

17. The signal transmitting apparatus of claim 12, wherein the program instructions causing the processor to convert the precoded signals and output the plurality of phase-adjusted RF signals are configured to cause the processor to:

set an analog beamforming matrix for a channel connected to each sub-connected array by selecting angles of signal paths having strongest intensity as many as a number of data streams and aligning beam formed by the analog beamforming matrix to at least one direction corresponding to the angles.

18. The signal transmitting apparatus of claim 12, wherein the program instructions are configured to further cause the processor to:

before splitting each of the plural message streams to be transmitted, determine the receivers and adjusting a proportion of the common data stream and the private data streams according to a signal-to-noise ratio of a transmission channel.

* * * * *